(12) United States Patent
Kozlov

(10) Patent No.: US 10,719,291 B2
(45) Date of Patent: Jul. 21, 2020

(54) SIMULTANEOUS OUTPUT OF MULTIPLE AUDIO TRACKS

(71) Applicant: ARRIS Enterprises LLC, Suwanee, GA (US)

(72) Inventor: Sergey Kozlov, Billerica, MA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 240 days.

(21) Appl. No.: 15/253,139

(22) Filed: Aug. 31, 2016

(65) Prior Publication Data

US 2018/0060022 A1    Mar. 1, 2018

(51) Int. Cl.
| | |
|---|---|
| *G06F 9/48* | (2006.01) |
| *G06F 3/16* | (2006.01) |
| *G06F 3/0484* | (2013.01) |
| *G10L 19/16* | (2013.01) |
| *G10L 15/00* | (2013.01) |

(52) U.S. Cl.
CPC ............ *G06F 3/165* (2013.01); *G06F 3/0484* (2013.01); *G10L 15/005* (2013.01); *G10L 19/167* (2013.01)

(58) Field of Classification Search
CPC ..... G06F 3/165; G06F 3/0484; G10L 19/167; G10L 15/005
See application file for complete search history.

(56) References Cited

U.S. PATENT DOCUMENTS

| | | | |
|---|---|---|---|
| 7,561,932 B1 | 7/2009 | Holmes et al. | |
| 2007/0124777 A1* | 5/2007 | Bennett | H04N 5/607 |
| | | | 725/78 |
| 2010/0011405 A1 | 1/2010 | Wu | |

(Continued)

FOREIGN PATENT DOCUMENTS

EP     2615852 A2    7/2013

OTHER PUBLICATIONS

Fehily, Chris, "Windows XP: Visual QuickStart Guide, Second Edition", Mar. 4, 2005, Peachpit Press, Second Edition, Chapter 4 "Configuring Sounds and Audio Devices", 11 pages (Year: 2005).*

(Continued)

*Primary Examiner* — Jennifer N To
*Assistant Examiner* — Kuang F Chen
(74) *Attorney, Agent, or Firm* — Buchanan Ingersoll & Rooney PC

(57) ABSTRACT

Methods, systems, and computer readable media can be operable to facilitate the processing and output of multiple audio streams associated with a piece of content. A multimedia device may identify and notify a user of multiple audio stream languages available for a received multimedia stream. Based upon user input, the multimedia device may identify a plurality of audio streams that are associated with user-selected languages, decode the identified audio streams, and output the decoded audio streams to one or more audio devices. The multimedia device may determine, for each audio stream, an audio device to which the audio stream is to be delivered. The multimedia device may output a video stream associated with the audio streams to a display device while outputting each respective audio stream of the multiple audio streams to the audio device designated for the respective audio stream.

17 Claims, 5 Drawing Sheets

(56) References Cited

U.S. PATENT DOCUMENTS

2012/0249874 A1* 10/2012 Smith ................ H04N 5/44513
          348/462
2012/0274850 A1* 11/2012 Hawkins ............ H04N 21/4307
          348/515
2013/0185639 A1* 7/2013 Lim ...................... G06F 3/0484
          715/727

OTHER PUBLICATIONS

Watkinson, John, "The MPEG Handbook, 2nd Edition", Sep. 10, 2012, Focal Press, 2nd Edition, Chapter 1.13 "MPEG bitstreams", 1 page (Year: 2012).*
PCT International Search Report & Written Opinion, Re: Application No. PCT/US2017/043725, dated Nov. 7, 2017.

* cited by examiner

SIMULTANEOUS OUTPUT OF MULTIPLE AUDIO TRACKS

TECHNICAL FIELD

This disclosure relates to the simultaneous output of multiple audio tracks.

BACKGROUND

Many households include members that speak more than one language, and typically, some members of a household are more proficient in one language while others are proficient in another language. Some members of a household may learn a foreign language that other members are not able to speak or understand. When members of a household that have differing language preferences gather together to enjoy a piece of multimedia content, some of the household members are able to enjoy the audio of the content while other members are unable to appreciate or understand the audio of the content. Moreover, individuals that have different tastes in music are left without a way to receive audio-only content of their own individual preference when gathered together within the same room or vehicle or when the content is received through a common receiver. Therefore, it is desirable to improve upon methods and systems for delivering different audio streams of a multimedia stream to different audio devices.

BRIEF DESCRIPTION OF THE DRAWINGS

Like reference numbers and designations in the various drawings indicate like elements.

DETAILED DESCRIPTION

Figure 1:
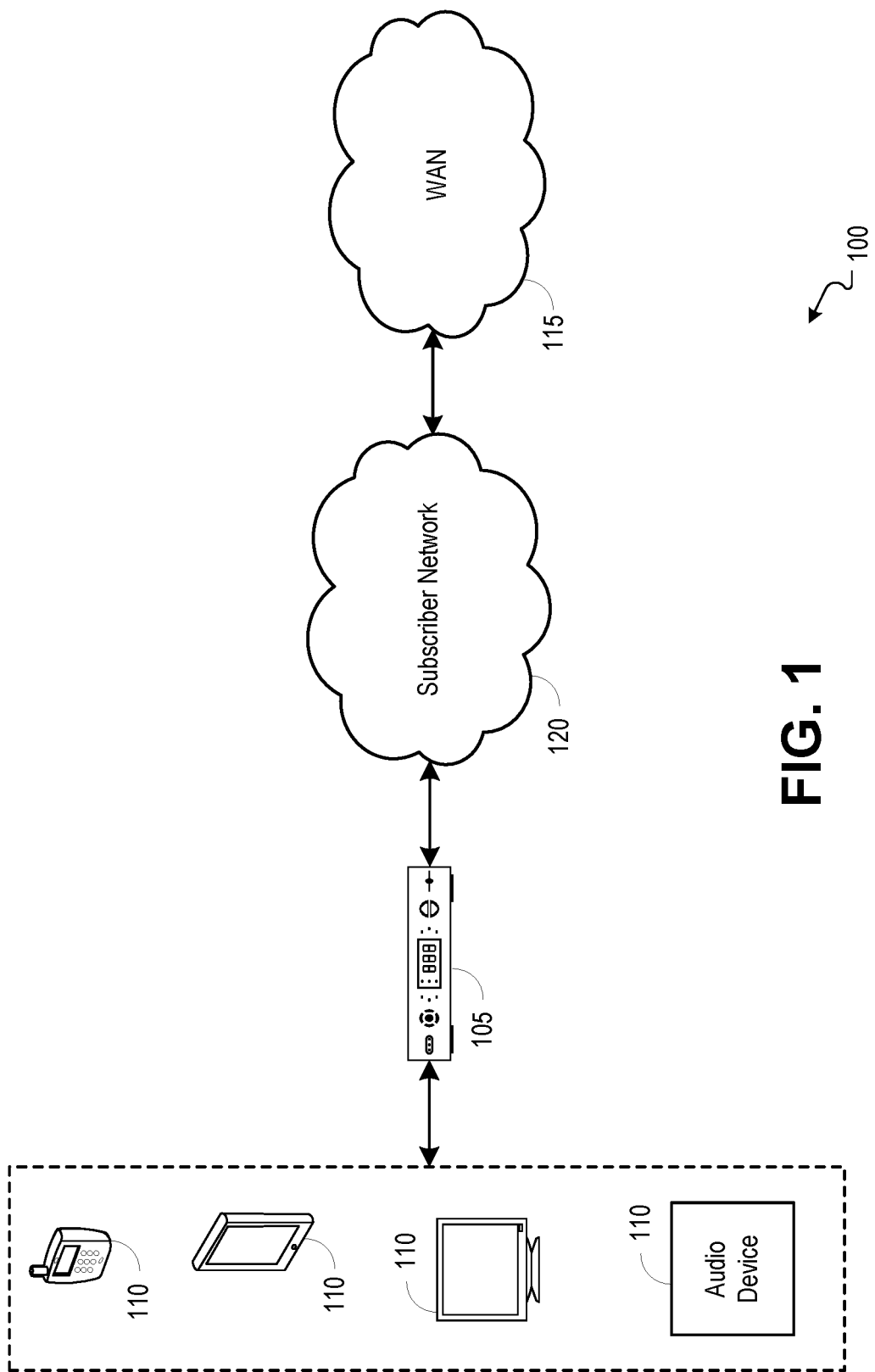
FIG. 1 is a block diagram illustrating an example network environment operable to facilitate the simultaneous processing and output of multiple audio streams.

It is desirable to improve upon methods and systems for delivering different audio streams of a multimedia stream to different audio devices. Methods, systems, and computer readable media can be operable to facilitate the simultaneous processing and output of multiple audio streams. A multimedia device may identify and notify a user of multiple audio stream languages available for a received multimedia stream. Based upon user input, the multimedia device may identify a plurality of audio streams that are associated with user-selected languages, decode the identified audio streams, and output the decoded audio streams to one or more audio devices. The multimedia device may determine, for each audio stream, an audio device to which the audio stream is to be delivered. The multimedia device may output a video stream associated with the audio streams to a display device while outputting each respective audio stream of the multiple audio streams to the audio device designated for the respective audio stream.

An embodiment of the invention described herein may include a method comprising: (a) receiving a piece of content that comprises a plurality of audio streams; (b) identifying at least two audio streams of the plurality of audio streams for output, wherein each respective one of the identified at least two audio streams is designated for output to one or more audio devices; and (c) outputting the identified at least two audio streams, wherein each respective one of the identified at least two audio streams is output to the one or more designated audio devices.

According to an embodiment of the invention, the method described herein further comprises: (a) identifying the plurality of audio streams and a language associated with each respective one of the plurality of audio streams from a program map table associated with the piece of content; (b) outputting a user interface that displays an identification of each identified language; and (c) wherein the at least two audio streams are identified for output based upon user input that identifies the languages associated with the at least two audio streams.

According to an embodiment of the invention, the method described herein further comprises: (a) receiving user input that identifies an audio device to which each respective one of the identified at least two audio streams is to be output; and (b) wherein each respective one of the identified at least two audio streams is output to the audio device identified by the user input as the audio device to which the audio stream is to be output.

According to an embodiment of the invention, the piece of content further comprises a video stream, and the video stream is output to a single display device while the at least two audio streams are output to the plurality of audio devices.

According to an embodiment of the invention, the one or more audio devices designated for each respective audio stream is determined based upon default settings.

According to an embodiment of the invention, the method described herein further comprises outputting a notification that identifies the one or more audio devices that are designated for each respective one of the at least two audio streams.

According to an embodiment of the invention, wherein the piece of content is received within a moving pictures experts group (MPEG) transport stream.

An embodiment of the invention described herein may include a system comprising: (a) a network interface configured to be used to receive a piece of content that comprises a plurality of audio streams; (b) a module configured to identify at least two audio streams of the plurality of audio streams for output, wherein each respective one of the identified at least two audio streams is designated for output to one or more audio devices; and (c) one or more output interfaces configured to be used to output the identified at least two audio streams, wherein each respective one of the identified at least two audio streams is output to the one or more designated audio devices.

According to an embodiment of the invention, the module is further configured to: (a) identify the plurality of audio streams and a language associated with each respective one of the plurality of audio streams from a program map table associated with the piece of content; (b) output a user interface that displays an identification of each identified language; and (c) wherein the at least two audio streams are identified for output based upon user input that identifies the languages associated with the at least two audio streams.

According to an embodiment of the invention, the module is further configured to: (a) receive user input that identifies an audio device to which each respective one of the identified at least two audio streams is to be output; and (b) wherein each respective one of the identified at least two audio streams is output to the audio device identified by the user input as the audio device to which the audio stream is to be output.

According to an embodiment of the invention, the module is further configured to output a notification that identifies the one or more audio devices that are designated for each respective one of the at least two audio streams.

An embodiment of the invention described herein may include one or more non-transitory computer readable media having instructions operable to cause one or more processors to perform the operations comprising: (a) receiving a piece of content that comprises a plurality of audio streams; (b) identifying at least two audio streams of the plurality of audio streams for output, wherein each respective one of the identified at least two audio streams is designated for output to one or more audio devices; and (c) outputting the identified at least two audio streams, wherein each respective one of the identified at least two audio streams is output to the one or more designated audio devices.

According to an embodiment of the invention, the instructions are further operable to cause the one or more processors to perform the operations comprising: (a) identifying the plurality of audio streams and a language associated with each respective one of the plurality of audio streams from a program map table associated with the piece of content; (b) outputting a user interface that displays an identification of each identified language; and (c) wherein the at least two audio streams are identified for output based upon user input that identifies the languages associated with the at least two audio streams.

According to an embodiment of the invention, the instructions are further operable to cause the one or more processors to perform the operations comprising: (a) receiving user input that identifies an audio device to which each respective one of the identified at least two audio streams is to be output; and (b) wherein each respective one of the identified at least two audio streams is output to the audio device identified by the user input as the audio device to which the audio stream is to be output.

According to an embodiment of the invention, the instructions are further operable to cause the one or more processors to perform the operations comprising outputting a notification that identifies the one or more audio devices that are designated for each respective one of the at least two audio streams.

FIG. 1 is a block diagram illustrating an example network environment 100 operable to facilitate the simultaneous processing and output of multiple audio streams. In embodiments, a multimedia device 105 may provide video, data and/or voice service(s) to one or more client devices 110 (e.g., multimedia sink devices). For example, the multimedia device 105 may output video and/or audio associated with received services to one or more client devices 110 that are connected to or otherwise associated with the multimedia device 105. The various data, multimedia, and/or voice services provided from the multimedia device 105 to the one or more client devices 110 may include, but is not limited to, live or broadcast television, video-on-demand (VoD) content, pay-per view content, recorded content (e.g., DVR content), audio-only content, streaming content, and others.

The multimedia device 105 may be a set-top box, gateway device, or any other device configured to receive and deliver one or more services to one or more client devices 110, and the client devices 110 may include a display device (e.g., television), a mobile device, a tablet, an audio device (e.g., headphones, speaker, etc.), or any other device configured to receive an audio and/or video output or other service from the multimedia device 105.

The multimedia device 110 may communicate with a wide area network (WAN) 115 through a connection to a subscriber network 120. The subscriber network 120 may be a hybrid fiber-coax (HFC) network, fiber network, mobile network, or other network capable of delivering one or more services to a subscriber premise.

In embodiments, multimedia content may be received at a multimedia device 105 as a content stream. The content may be delivered to the multimedia device 105 as a stream of packets or frames (e.g., IP (Internet protocol) stream, MPEG (moving picture experts group) stream, etc.), and the packets or frames may be decoded and processed for presentation to a user through a connected client device 110.

In embodiments, a video stream may be received at a multimedia device 105 along with a plurality of audio streams that are associated with the video stream. Each audio stream may carry a different audio track or rendition for the audio that is associated with the video stream. For example, each audio stream may include a rendition of the audio in a different language. The different audio streams may be distinguished based upon unique PID (packet identifier) values of the audio streams, and the languages of the different audio streams may be identified within a PMT (program map table) carried by a transport stream that is received at the multimedia device 105. When a transport stream is received at the multimedia device 105, the multimedia device 105 may identify the different audio streams (e.g., the PID value of each audio stream) and the language associated with each of the audio streams from the PMT carried by the transport stream.

The multimedia device 105 may notify a user/viewer of the different audio stream languages that are available for a video stream that is to be output from the multimedia device 105 to a client device 110. The notification may be output, for example, as a user interface displayed at a display device connected to or associated with the multimedia device 105 (e.g., the display device to which the video stream is to be output). The user may select a plurality of the available audio stream languages for output to one or more audio devices, and the multimedia device 105 may decode each of the selected audio streams and output the decoded audio streams to the designated audio device(s) while the associated video stream is output to a display device. The multimedia device 105 may identify the PID value associated with each respective one of the plurality of selected languages and may decode the audio stream with the PID value of the respective language.

In embodiments, the multimedia device 105 may output each respective one decoded audio stream to one or more designated audio devices. The audio devices may include headphones, a speaker or speaker system, or any other device configured as an audio sink or audio output device. The audio device to which a particular audio stream is to be output may be determined based upon default settings at the multimedia device 105 (e.g., a language configured at the multimedia device 105 as a primary language may be output to a speaker system while subsidiary languages may be output to headphones), user input designating one or more audio devices for each audio stream (e.g., a user may identify a specific audio device to receive an audio stream of a specific language when the specific language is selected for output), or the audio devices may be randomly assigned to receive the output of certain audio streams. When each audio stream is assigned to one or more audio devices, the multimedia device 105 may notify a user/viewer of the audio device(s) to which the output of each audio stream is assigned. The different audio devices may be differentiated from each other using a naming convention (e.g., audio output 1, audio output 2, etc.), device names, device manufacturers or model numbers, MAC (media access control) address, or any other device identifier.

It should be understood that the audio streams may be output from the multimedia device 105 to different audio devices (or other client devices 110) using various techniques, standards, and/or protocols. For example, the connection between an audio device and the multimedia device 105 may be a wired connection or a wireless connection (e.g., Bluetooth, Wi-Fi, etc.).

It should be understood that multimedia device 105 may receive, process, and simultaneously output multiple audio tracks received at the multimedia device 105 within a single or multiple audio streams. For example, the multimedia device 105 may be a STB, audio system, car stereo, or other device configured to receive audio content, and the multimedia device 105 may receive different pieces of audio content within a single or multiple different streams. The multimedia device 105 may identify the different pieces of audio content using unique PID values (or other identifiers) assigned to the different audio tracks, and the multimedia device 105 may process and output selected pieces of audio content to one or more selected audio devices.

Figure 2:
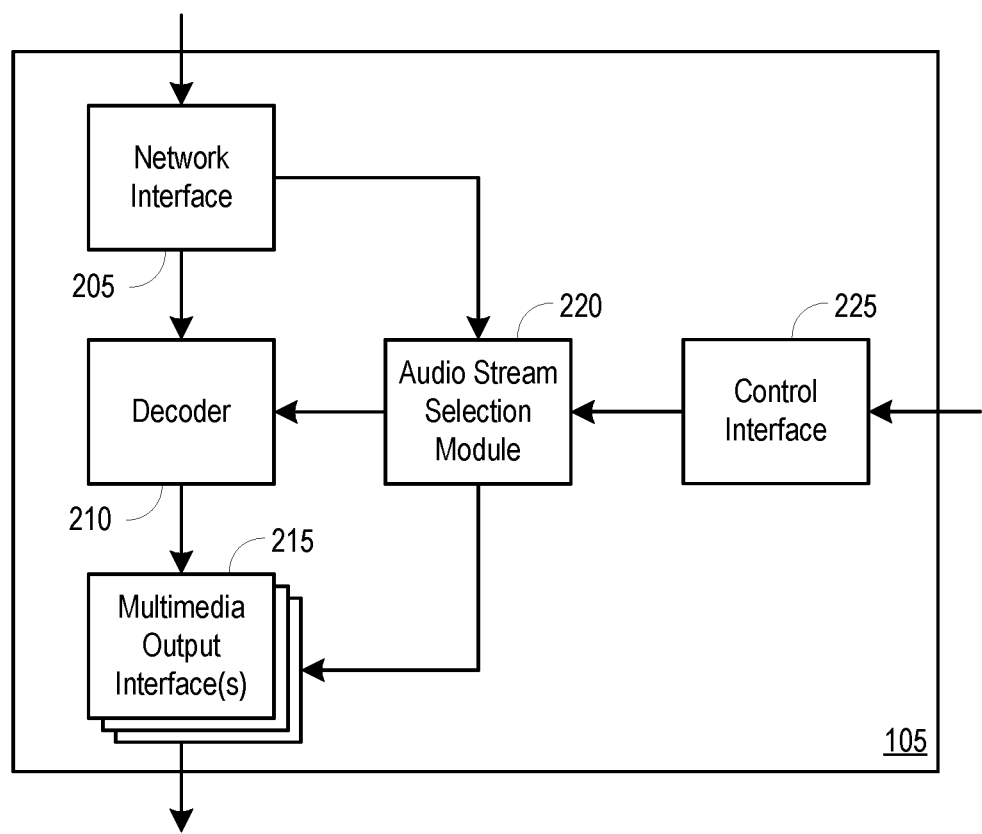
FIG. 2 is a block diagram illustrating an example multimedia device operable to facilitate the simultaneous processing and output of multiple audio streams.

FIG. 2 is a block diagram illustrating an example multimedia device 105 operable to facilitate the simultaneous processing and output of multiple audio streams. The multimedia device 105 may include a network interface 205, a decoder 210, one or more multimedia output interfaces 215, an audio stream selection module 220, and a control interface 225.

In embodiments, a transport stream carrying a video stream along with a plurality of audio streams that are associated with the video stream may be received at the multimedia device 105 through the network interface 205. Each audio stream may carry a different audio track or rendition for the audio that is associated with the video stream. For example, each audio stream may include a rendition of the audio in a different language. The different audio streams may be distinguished based upon unique PID (packet identifier) values of the audio streams, and the languages of the different audio streams may be identified within a PMT (program map table) carried by the transport stream that is received at the multimedia device 105.

When a transport stream is received at the multimedia device 105, the audio stream selection module 220 may identify the different audio streams (e.g., the PID value of each audio stream) and the language associated with each of the audio streams from the PMT carried by the transport stream. The audio stream selection module 220 may notify a user/viewer of the different audio stream languages that are available for a video stream that is to be output from the multimedia device 105 to a client device 110. The notification may be output, for example, as a user interface displayed at a display device connected to or associated with the multimedia device 105 (e.g., the display device to which the video stream is to be output), and the user interface may be output through one or more of the multimedia output interfaces 215. A user selection of a plurality of the available audio stream languages for output to one or more audio devices may be received by the multimedia device 105 through the control interface 225.

In embodiments, the audio stream selection module 220 may identify the PID value associated with each respective one of the plurality of selected languages, and the decoder 210 may decode each of the selected audio streams by decoding each audio stream having a PID value that is associated with a user-selected language.

In embodiments, each respective one decoded audio stream may be output to one or more designated audio devices through one or more of the multimedia output interfaces 215. The audio devices may include headphones, a speaker or speaker system, or any other device configured as an audio sink or audio output device. The audio device to which a particular audio stream is to be output may be determined by the audio stream selection module 220 based upon default settings at the multimedia device 105 (e.g., a language configured at the multimedia device 105 as a primary language may be output to a speaker system while subsidiary languages may be output to headphones), user input designating one or more audio devices for each audio stream (e.g., a user may identify a specific audio device to receive an audio stream of a specific language when the specific language is selected for output), or the audio devices may be randomly assigned to receive the output of certain audio streams. A notification as to which of the audio devices each audio stream is to be output may be output from the audio stream selection module as a user interface to a display through one or more of the multimedia output interfaces 215. The different audio devices may be differentiated from each other using a naming convention (e.g., audio output 1, audio output 2, etc.), device names, device manufacturers or model numbers, MAC (media access control) address, or any other device identifier.

It should be understood that the multimedia output interfaces 215 may include various wired and/or wireless interfaces and that the audio streams may be output from the multimedia output interfaces 215 to different audio devices (or other client devices 110 of FIG. 1) using various techniques, standards, and/or protocols.

In embodiments, the multimedia device 105 may be an audio-only device such as a speaker system, and one or more audio streams carrying at least two different audio tracks may be received at the audio-only device. For example, the different audio tracks may be different pieces of audio-only content. The audio stream selection module 220 may select one or more of the different audio tracks for processing and output to one or more different targeted audio devices. For example, each audio track may be selected for output to a certain designated audio device (e.g., client device 110).

Figure 3:
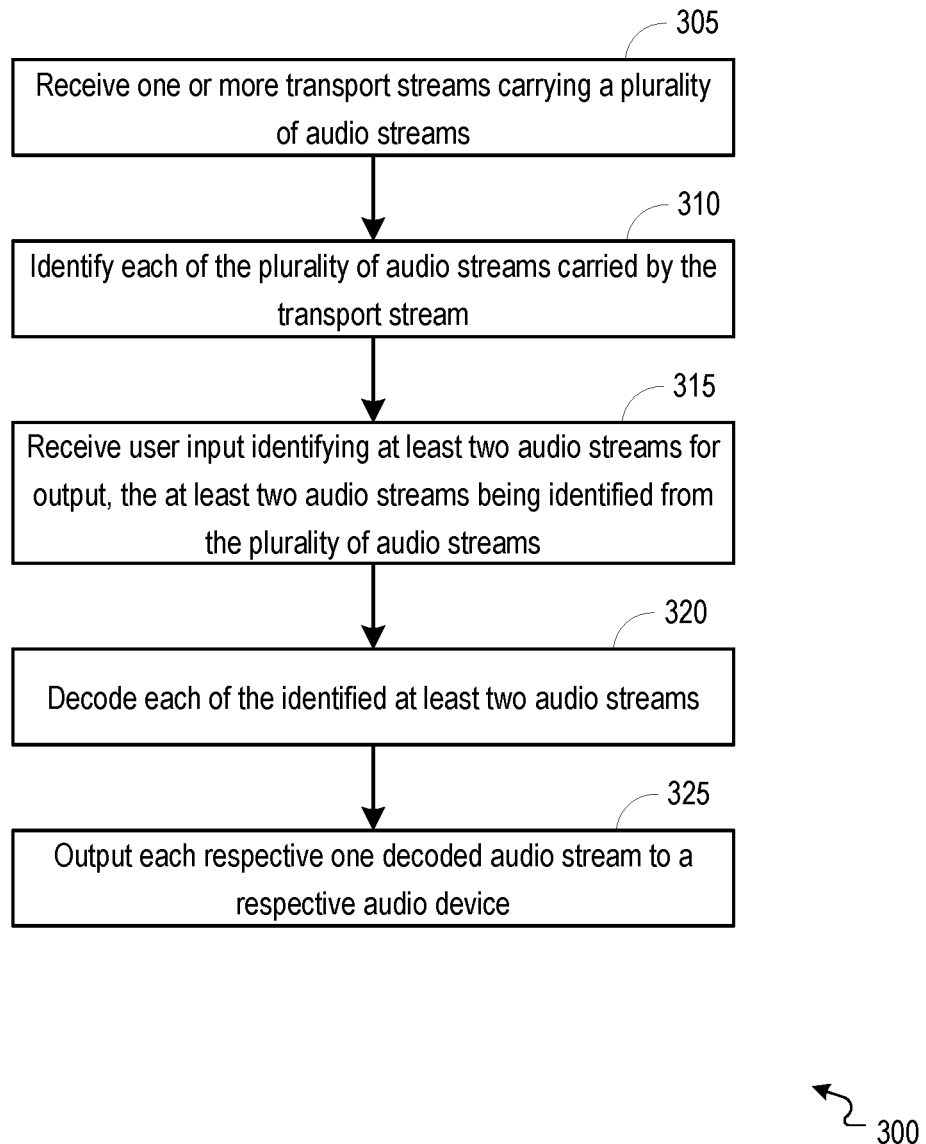
FIG. 3 is a flowchart illustrating an example process operable to facilitate the simultaneous processing and output of multiple audio streams.

FIG. 3 is a flowchart illustrating an example process 300 operable to facilitate the simultaneous processing and output of multiple audio streams. The process 300 may begin at 305 when one or more transport streams are received, the transport stream(s) carrying a plurality of audio streams. The transport stream(s) may be received, for example, at a multimedia device 105 of FIG. 1. In embodiments, the received transport stream(s) may include a video stream associated with a piece of content selected by a subscriber for output to one or more display devices and one or more audio streams associated with the video stream. For example, the transport stream(s) may include an audio stream for each of one or more languages for which an audio track associated with the video stream is available. The transport stream may be an MPEG (moving pictures expert group) stream having audio packets with different PID (packet identifier) values that are used to carry the different audio tracks (e.g., the different audio renditions for the various languages) for a piece of content. In embodiments, the one or more transport streams may carry a plurality of audio streams associated with one or more pieces of audio-only content. For example, each of the received audio streams may be an audio rendition of different pieces of audio-only content.

At 310, each of the plurality of audio streams carried by the transport stream(s) may be identified. Each audio stream may be identified, for example, by the multimedia device 105 (e.g., by an audio stream selection module 220 of FIG. 2). In embodiments, the different audio streams and the language associated with each audio stream may be identified and listed within the PMT (program map table) of the transport stream(s). The audio stream selection module 220 may retrieve the PMT from the transport stream and may identify each available audio stream that is listed within the PMT. When the available audio streams are identified, the multimedia device 105 may present the available audio streams to a viewer within a displayed user interface. For example, the multimedia device 105 may output a user interface for display at a display or client device, and the user interface may include an identification of the different languages for which audio of the received transport stream is available.

At 315, user input identifying at least two audio streams for output may be received, wherein the at least two audio streams are identified from the plurality of audio streams. The user input may be received at the multimedia device 105 and may be received from a client device (e.g., client device 110 of FIG. 1) or control device (e.g., remote control unit (RCU)). In embodiments, a user may select two or more of the audio streams presented to the user within a user interface. For example, the user input may identify two or more different languages for outputting audio associated with multimedia content carried by the transport stream.

At 320, each of the identified at least two audio streams may be decoded. The audio streams may be decoded, for example, by the multimedia device 105. For example, the audio stream selection module 220 may identify the audio streams, and the decoder 210 of FIG. 2 may decode the identified audio streams. In embodiments, information retrieved from the PMT of the transport stream may be utilized to identify and decode the audio streams identified from the user input. For example, the audio stream selection module 220 may identify the PID values of the audio streams that are associated with the identified languages, and the decoder 210 may decode the audio streams having the identified PID values.

At 325, each respective one decoded audio stream may be output to a respective audio device. The decoded audio streams may be output, for example, by the multimedia device 105. In embodiments, each of the decoded audio streams may be output to one or more specific audio devices (e.g., headphones, speaker, etc.). The specific audio device to which an audio stream is output may be determined based upon default settings at the multimedia device 105, instructions received within the user input, or may be randomly assigned. The multimedia device 105 may output a notification to a user/viewer that indicates which specific audio streams (e.g., languages, audio tracks, etc.) are output to which audio device(s). It should be understood that the audio streams may be output to various audio devices using various wired and/or wireless communication techniques, protocols, and/or standards. The multimedia device 105 may output a video stream associated with the audio streams to a display device while outputting each respective audio stream of the multiple audio streams to the audio device designated for the respective audio stream.

Figure 4:
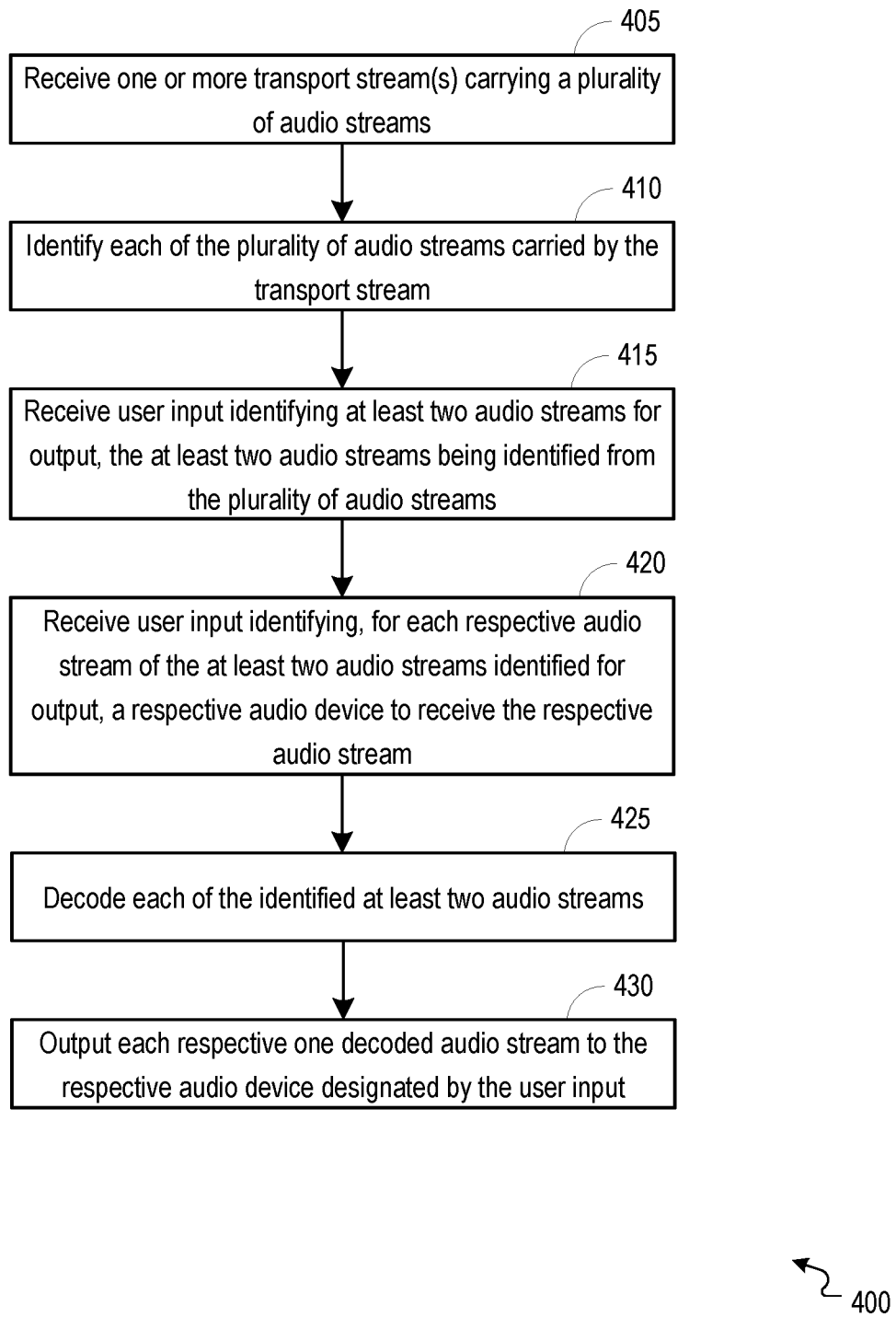
FIG. 4 is a flowchart illustrating an example process operable to facilitate the processing and output of multiple audio streams, each of the audio streams being output to a user-designated audio device.

FIG. 4 is a flowchart illustrating an example process 400 operable to facilitate the processing and output of multiple audio streams associated with a piece of content, each of the audio streams being output to a user-designated audio device. The process 400 may begin at 405 when one or more transport streams are received, the transport stream(s) carrying a plurality of audio streams. The transport stream(s) may be received, for example, at a multimedia device 105 of FIG. 1. In embodiments, the received transport stream(s) may include a video stream associated with a piece of content selected by a subscriber for output to one or more display devices and one or more audio streams associated with the video stream. For example, the transport stream(s) may include an audio stream for each of one or more languages for which an audio track associated with the video stream is available. The transport stream may be an MPEG (moving pictures expert group) stream having audio packets with different PID (packet identifier) values that are used to carry the different audio tracks (e.g., the different audio renditions for the various languages) for a piece of content. In embodiments, the one or more transport streams may carry a plurality of audio streams associated with one or more pieces of audio-only content. For example, each of the received audio streams may be an audio rendition of different pieces of audio-only content.

At 410, each of the plurality of audio streams carried by the transport stream may be identified. Each audio stream may be identified, for example, by the multimedia device 105 (e.g., by an audio stream selection module 220 of FIG. 2). In embodiments, the different audio streams and the language associated with each audio stream may be identified and listed within the PMT (program map table) of the transport stream. The audio stream selection module 220 may retrieve the PMT from the transport stream and may identify each available audio stream that is listed within the PMT. When the available audio streams are identified, the multimedia device 105 may present the available audio streams to a viewer within a displayed user interface. For example, the multimedia device 105 may output a user interface for display at a display or client device, and the user interface may include an identification of the different languages for which audio of the received transport stream is available.

At 415, user input identifying at least two audio streams for output may be received, wherein the at least two audio streams are identified from the plurality of audio streams. The user input may be received at the multimedia device 105 and may be received from a client device (e.g., client device 110 of FIG. 1) or control device (e.g., remote control unit (RCU)). In embodiments, a user may select two or more of the audio streams presented to the user within a user interface. For example, the user input may identify two or more different languages for outputting audio associated with multimedia content carried by the transport stream.

At 420, user input identifying one or more audio devices for each respective audio stream of the at least two audio streams may be received. The user input may be received at the multimedia device 105 and may be received from a client device (e.g., client device 110 of FIG. 1) or control device (e.g., remote control unit (RCU)). In embodiments, a user interface may prompt a user to designate an audio device (e.g., headphones, speaker, etc.) for each of the audio streams identified for output from the plurality of audio streams. For example, the user interface may provide an identification of one or more audio devices that are available for receiving an audio stream from the multimedia device 105. The user may select an audio stream for output and a corresponding audio device to which the selected audio stream is to be output.

At 425, each of the identified at least two audio streams may be decoded. The audio streams may be decoded, for example, by the multimedia device 105. For example, the audio stream selection module 220 may identify the audio streams, and the decoder 210 of FIG. 2 may decode the identified audio streams. In embodiments, information retrieved from the PMT of the transport stream may be utilized to identify and decode the audio streams identified from the user input. For example, the audio stream selection module 220 may identify the PID values of the audio streams that are associated with the identified languages, and the decoder 210 may decode the audio streams having the identified PID values.

At 430, each respective one decoded audio stream may be output to a respective audio device. The decoded audio streams may be output, for example, by the multimedia device 105. In embodiments, each of the decoded audio streams may be output to one or more specific audio devices (e.g., headphones, speaker, etc.). The specific audio device to which an audio stream is output may be the audio device selected to receive the audio stream as indicated by the user input received by the multimedia device 105 at 420. It should be understood that the audio streams may be output to various audio devices using various wired and/or wireless communication techniques, protocols, and/or standards.

Figure 5:
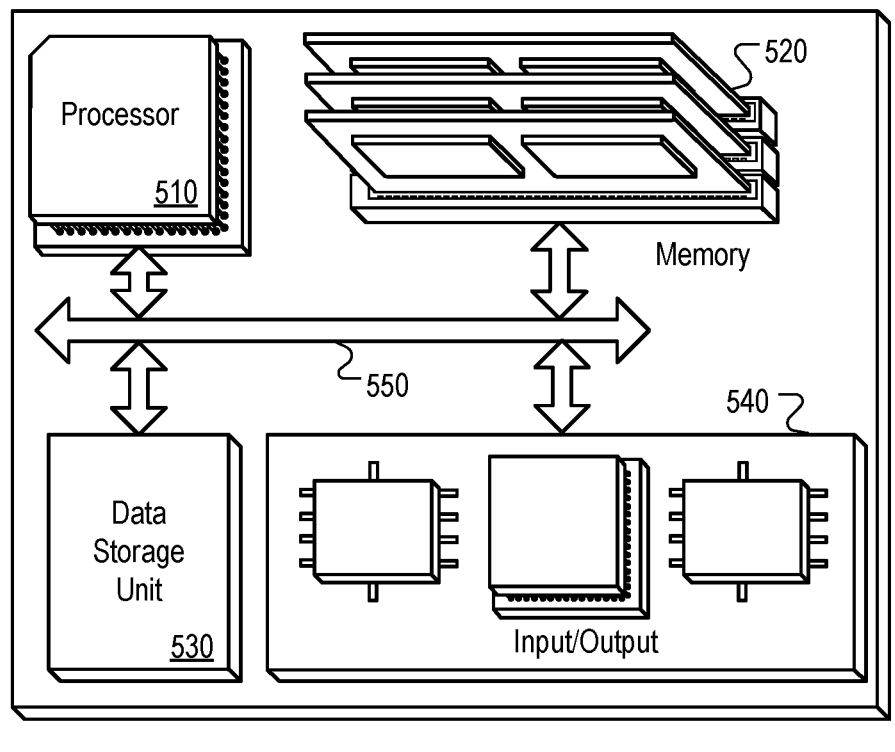
FIG. 5 is a block diagram of a hardware configuration operable to facilitate the simultaneous processing and output of multiple audio streams.

FIG. 5 is a block diagram of a hardware configuration 500 operable to facilitate the processing and output of multiple audio streams associated with a piece of content. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a client device 110 of FIG. 1 (e.g., display device, mobile, device, tablet, audio device, etc.). In embodiments, the input/output device can include driver devices configured to send communications to, and receive communications from one or more networks (e.g., local network, subscriber network 120 of FIG. 1, WAN 115 of FIG. 1, etc.).

Those skilled in the art will appreciate that the invention improves upon methods and systems for delivering multiple audio streams associated with a multimedia stream to different audio devices. Methods, systems, and computer readable media can be operable to facilitate the processing and output of multiple audio streams associated with a piece of content. A multimedia device may identify and notify a user of multiple audio stream languages available for a received multimedia stream. Based upon user input, the multimedia device may identify a plurality of audio streams that are associated with user-selected languages, decode the identified audio streams, and output the decoded audio streams to one or more audio devices. The multimedia device may determine, for each audio stream, an audio device to which the audio stream is to be delivered. The multimedia device may output a video stream associated with the audio streams to a display device while outputting each respective audio stream of the multiple audio streams to the audio device designated for the respective audio stream.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving a piece of content that comprises a plurality of audio streams, wherein the piece of content is received at a multimedia device;
   identifying a packet identifier associated with each respective one audio stream of the plurality of audio streams and identifying a language associated with each respective one of the plurality of audio streams from a program map table associated with the piece of content;
   outputting a user interface that displays an identification of each identified language, wherein the displayed identification of each identified language is generated by the multimedia device based upon the identification of the languages from the program map table associated with the piece of content;
   identifying at least two audio streams of the plurality of audio streams for output, wherein each respective one of the identified at least two audio streams is designated for output to one or more audio devices, wherein the at least two audio streams are identified based upon user input that is received by the multimedia device in response to the output of the user interface displaying an identification of each identified language associated with each respective one of the plurality of audio streams, wherein the user input selects at least two displayed languages that are associated with the at least two identified audio streams, and wherein the at least two audio streams are identified according to a setting of the multimedia device that identifies a primary language and one or more subsidiary languages, wherein the at least two identified audio streams comprises an audio stream associated with the primary language and one or more audio streams associated with one or more subsidiary languages, and wherein the setting designates a speaker system for receiving the audio stream associated with the primary language and one or more headphones for receiving the one or more audio streams associated with the one or more subsidiary languages, and wherein the at least two audio streams are identified for output based upon user input that identifies the languages associated with the at least two audio streams;
   from the piece of content, decoding each audio stream having a packet identifier that is associated with a user-selected language that is selected from the user input; and
   outputting the identified at least two audio streams from the multimedia device, wherein the audio stream associated with the primary language is output to the speaker system and the one or more audio streams associated with the one or more subsidiary languages are output to the one or more headphones.

2. The method of claim 1, further comprising:
   receiving user input that identifies an audio device to which each respective one of the identified at least two audio streams is to be output; and
   wherein each respective one of the identified at least two audio streams is output to the audio device identified by the user input as the audio device to which the audio stream is to be output.

3. The method of claim 1, wherein the piece of content further comprises a video stream, and wherein the video stream is output to a single display device while the at least two audio streams are output to the plurality of audio devices.

4. The method of claim 1, wherein the one or more audio devices designated for each respective audio stream is determined based upon default settings.

5. The method of claim 1, further comprising:
   outputting a notification that identifies the one or more audio devices that are designated for each respective one of the at least two audio streams.

6. The method of claim 1, wherein the piece of content is received within a moving pictures experts group (MPEG) transport stream.

7. A system comprising:
a network interface that receives a piece of content that comprises a plurality of audio streams, identifies a packet identifier associated with each respective one audio stream of the plurality of audio streams, identifies a language associated with each respective one of the plurality of audio streams from a program map table associated with the piece of content, and outputs a user interface that displays an identification of each identified language, wherein the displayed identification of each identified language is generated based upon the identification of the languages from the program map table associated with the piece of content;
a module that identifies at least two audio streams of the plurality of audio streams for output, wherein each respective one of the identified at least two audio streams is designated for output to one or more audio devices, wherein the at least two audio streams are identified based upon user input that is received by the multimedia device in response to the output of the user interface displaying an identification of each identified language associated with each respective one of the plurality of audio streams, wherein the user input selects at least two displayed languages that are associated with the at least two identified audio streams, and wherein the at least two audio streams are identified according to a setting that identifies a primary language and one or more subsidiary languages, wherein the at least two identified audio streams comprises an audio stream associated with the primary language and one or more audio streams associated with one or more subsidiary languages, and wherein the setting designates a speaker system for receiving the audio stream associated with the primary language and one or more headphones for receiving the one or more audio streams associated with the one or more subsidiary languages, and wherein the at least two audio streams are identified for output based upon user input that identifies the languages associated with the at least two audio streams;
one or more decoders that, from the piece of content, decode each audio stream having a packet identifier that is associated with a user-selected language that is selected from the user input; and
one or more output interfaces that output the identified at least two audio streams, wherein the audio stream associated with the primary language is output to the speaker system and the one or more audio streams associated with the one or more subsidiary languages are output to the one or more headphones.

8. The system of claim 7, wherein the module further:
receives user input that identifies an audio device to which each respective one of the identified at least two audio streams is to be output; and
wherein each respective one of the identified at least two audio streams is output to the audio device identified by the user input as the audio device to which the audio stream is to be output.

9. The system of claim 7, wherein the piece of content further comprises a video stream, and wherein the video stream is output to a single display device while the at least two audio streams are output to the plurality of audio devices.

10. The system of claim 7, wherein the one or more audio devices designated for each respective audio stream is determined based upon default settings.

11. The system of claim 7, wherein the module further:
outputs a notification that identifies the one or more audio devices that are designated for each respective one of the at least two audio streams.

12. One or more non-transitory computer readable media having instructions operable to cause one or more processors to perform the operations comprising:
receiving a piece of content that comprises a plurality of audio streams;
identifying a packet identifier associated with each respective one audio stream of the plurality of audio streams and identifying a language associated with each respective one of the plurality of audio streams from a program map table associated with the piece of content;
outputting a user interface that displays an identification of each identified language, wherein the displayed identification of each identified language is generated based upon the identification of the languages from the program map table associated with the piece of content;
identifying at least two audio streams of the plurality of audio streams for output, wherein each respective one of the identified at least two audio streams is designated for output to one or more audio devices, wherein the at least two audio streams are identified based upon user input that is received by the multimedia device in response to the output of the user interface displaying an identification of each identified language associated with each respective one of the plurality of audio streams, wherein the user input selects at least two displayed languages that are associated with the at least two identified audio streams, and wherein the at least two audio streams are identified according to a setting of the multimedia device that identifies a primary language and one or more subsidiary languages, wherein the at least two identified audio streams comprises an audio stream associated with the primary language and one or more audio streams associated with one or more subsidiary languages, and wherein the setting designates a speaker system for receiving the audio stream associated with the primary language and one or more headphones for receiving the one or more audio streams associated with the one or more subsidiary languages, and wherein the at least two audio streams are identified for output based upon user input that identifies the languages associated with the at least two audio streams;
from the piece of content, decoding each audio stream having a packet identifier that is associated with a user-selected language that is selected from the user input; and
outputting the identified at least two audio streams, wherein the audio stream associated with the primary language is output to the speaker system and the one or more audio streams associated with the one or more subsidiary languages are output to the one or more headphones.

13. The one or more non-transitory computer-readable media of claim 12, wherein the instructions are further operable to cause the one or more processors to perform the operations comprising:
receiving user input that identifies an audio device to which each respective one of the identified at least two audio streams is to be output; and wherein each respective one of the identified at least two audio streams is output to the audio device identified by the user input as the audio device to which the audio stream is to be output.

14. The one or more non-transitory computer-readable media of claim 12, wherein the piece of content further comprises a video stream, and wherein the video stream is output to a single display device while the at least two audio streams are output to the plurality of audio devices.

15. The one or more non-transitory computer-readable media of claim 12, wherein the one or more audio devices designated for each respective audio stream is determined based upon default settings.

16. The one or more non-transitory computer-readable media of claim 12, wherein the instructions are further operable to cause the one or more processors to perform the operations comprising:
   outputting a notification that identifies the one or more audio devices that are designated for each respective one of the at least two audio streams.

17. The one or more non-transitory computer-readable media of claim 12, wherein the piece of content is received within a moving pictures experts group (MPEG) transport stream.

\* \* \* \* \*